United States Patent [19]

Veralrud

[11] 4,293,075
[45] Oct. 6, 1981

[54] CABINET FOR HOLDING MAGNETIC TAPE CARTRIDGES AND CASSETTES

[75] Inventor: Guy G. Veralrud, Canoga Park, Calif.

[73] Assignee: Kustom Kreations, Inc., Northridge, Calif.

[21] Appl. No.: 83,790

[22] Filed: Oct. 11, 1979

[51] Int. Cl.³ .............................................. A47B 81/00
[52] U.S. Cl. ....................... 211/40; 206/387; D3/35; 312/350
[58] Field of Search .............. 211/40, 41; 206/387; D3/35; 312/10, 11, 12, 350

[56] References Cited

U.S. PATENT DOCUMENTS

| | | | |
|---|---|---|---|
| 3,385,643 | 5/1968 | Adell | 312/350 X |
| 3,889,817 | 6/1975 | Berkman | 312/11 X |
| 4,117,931 | 10/1978 | Berkman | 206/387 |
| 4,221,440 | 9/1980 | Morgan | 312/11 |
| 4,231,473 | 11/1980 | Aprahamian | 206/387 |

*Primary Examiner*—Roy D. Frazier
*Assistant Examiner*—Robert W. Gibson, Jr.
*Attorney, Agent, or Firm*—Charles H. Schwartz; Ellsworth R. Roston

[57] ABSTRACT

A holder for receiving and supporting magnetic tape cartridges, cassettes or containers for the cassettes each having a particular height and width dimension and with the holder including a pair of spaced sidewalls and with the distance between the spaced sidewalls approximately equal to the width of the containers for the cassettes, a plurality of pairs of spaced shelf supports extending from the sidewalls and forming a column of separate openings for receiving and supporting the cartridges, cassettes and containers for the cassettes and with the distance between the adjacent shelf supports on the same sidewall approximately equal to the height of the cartridges, a plurality of pairs of spaced stepped portions each extending from a sidewall and one shelf support and within an opening and with the distance between each stepped portion and the other adjacent shelf support on the same sidewall approximately equal to the height of the containers for the cassettes and with the distance between each pair of spaced stepped portions on opposite sidewalls approximately equal to the width of the cartridge, and a plurality of pairs of spaced projecting locking portions each extending from a sidewall and within one opening and with the height of each locking portion approximately equal to the height of the cassette and the distance between each pair of spaced locking portions on opposite sidewalls approximately equal to the width of the cassette.

9 Claims, 5 Drawing Figures

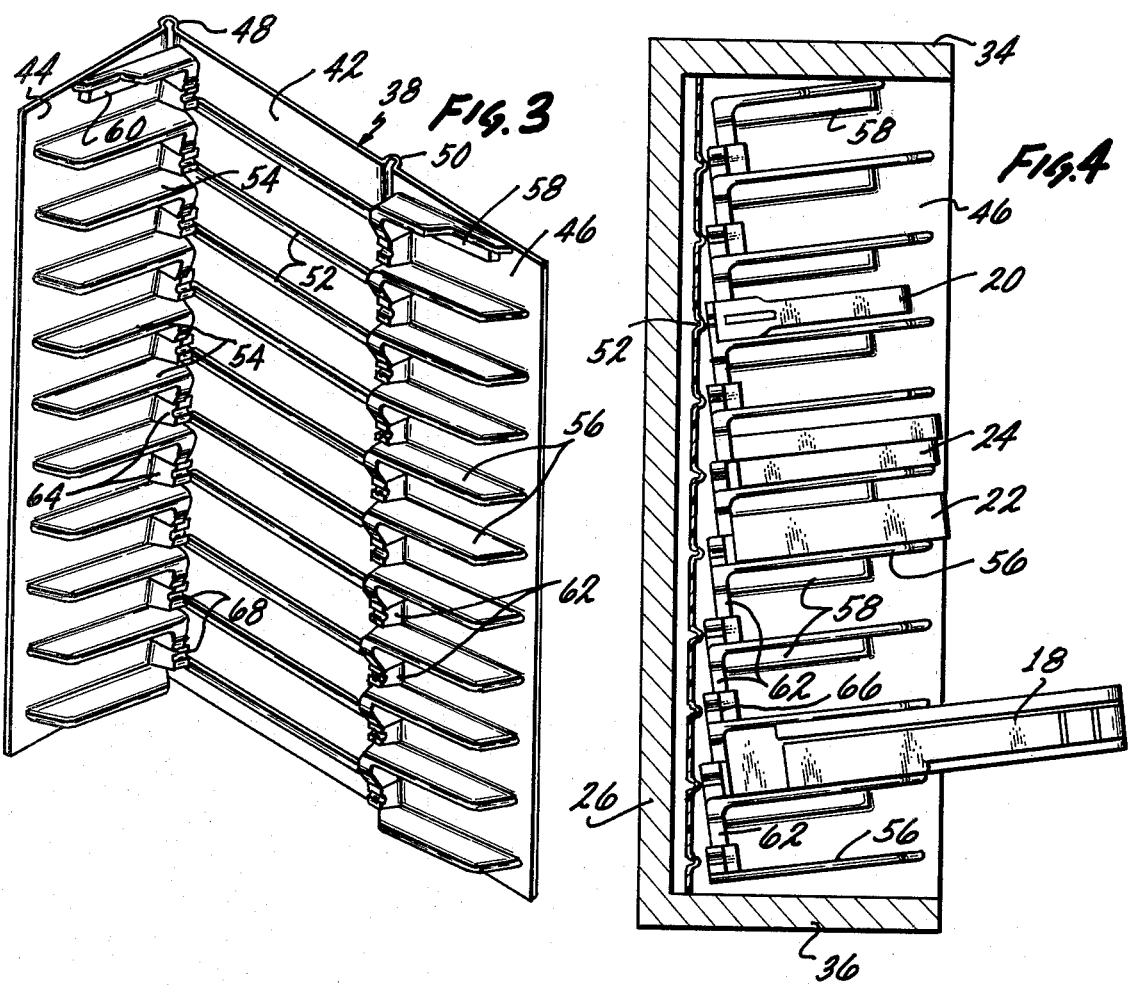

CABINET FOR HOLDING MAGNETIC TAPE CARTRIDGES AND CASSETTES

The present invention is directed to a cabinet for holding and storing magnetic tape cartridges and cassettes. There are now generally on the market one type of magnetic tape cartridge and one type of magnetic tape cassette. The magnetic tape cartridges are fairly large in size and generally include eight tracks of information and with the tape stored within the cartridge on a single reel and using an endless loop of tape to present portions of the tape for reproduction or recording. The magnetic tape cassettes are smaller in size and generally include four tracks of information and with a reel-to-reel arrangement to present portions of the tape for reproduction or recording. The smaller reel-to-reel cassettes may be sometimes kept in a box or container when they are not being used and these boxes may take different forms but are generally similar in size. Alternately, the reel-to-reel cassettes may not be kept in a box when not in use. The endless loop eight track cape cartridges are generally not kept in any box when not in use.

It is desirable to store the different types of magnetic tape cartridges and cassettes in a storage holder so that the cartridges and cassettes are readily accessible yet with the cartridges and cassettes being protected when not in use. It would be particularly desirable to have some sort of holder for the different types of magnetic tape cartridges and cassettes which could store all of these different types whether they are contained in boxes or not and with the holder providing for a secure storage of the different types of cartridges and cassettes.

The present invention, therefore, is directed to a holder for storing different types of magnetic tape cartridges and cassettes which includes a plurality of separate openings formed as a column and with each opening including shelf supports for receiving and supporting cartridges, cassettes or boxes for cassettes. The width of each opening has a maximum dimension so as to receive the maximum width dimension which is for the boxes for the cassettes. In addition, the height of each opening again has a maximum dimension so as to receive the maximum height dimension which is for the cartridges. In addition, the openings include stepped portions which provide for a decreased height and width for the openings so that the cartridges and boxes for the cassettes will be received and maintained in position without too much free play within the openings.

Each opening also includes a further locking portion at the inner end of each opening so as to receive and lock the cassettes when not in a box. The present invention, therefore, includes particular dimensions and particular configurations for each opening so as to be adaptable to receive the different variations in cartridge, cassette and box structure. This allows different types of cartridges, cassettes and cassettes held in different types of boxes to be stored in the same holder structure but also allows access and removal of individual cartridges and cassettes from the holder when the cartridge or cassette is removed for replay or recording.

The present invention may include a single or a plurality of columns of openings and the openings may be located either on one or more than one side of the holder so as to provide for storage of a larger number of magnetic tape cartridges or cassettes with a single holder unit.

A clearer understanding of the invention will be had with reference to the following description and drawings wherein FIG. 1 illustrates a perspective view of a first embodiment of a magnetic tape cartridge and cassette holder and showing the holder receiving and storing different types of magnetic tape cartridges, cassettes and cassettes contained in different types of boxes;

FIG. 3 illustrates a single molded unit to provide for the plurality of separate shelves for receiving the individual cartridges and cassettes;

FIG. 4 illustrates a side cross-sectional view of the first embodiment and again showing the holder receiving and storing a plurality of different types of magnetic tape cartridges and cassettes; and FIG. 5 illustrates a top cross-sectional view of a second embodiment of the invention including storage on both sides of the holder.

Figure 1:
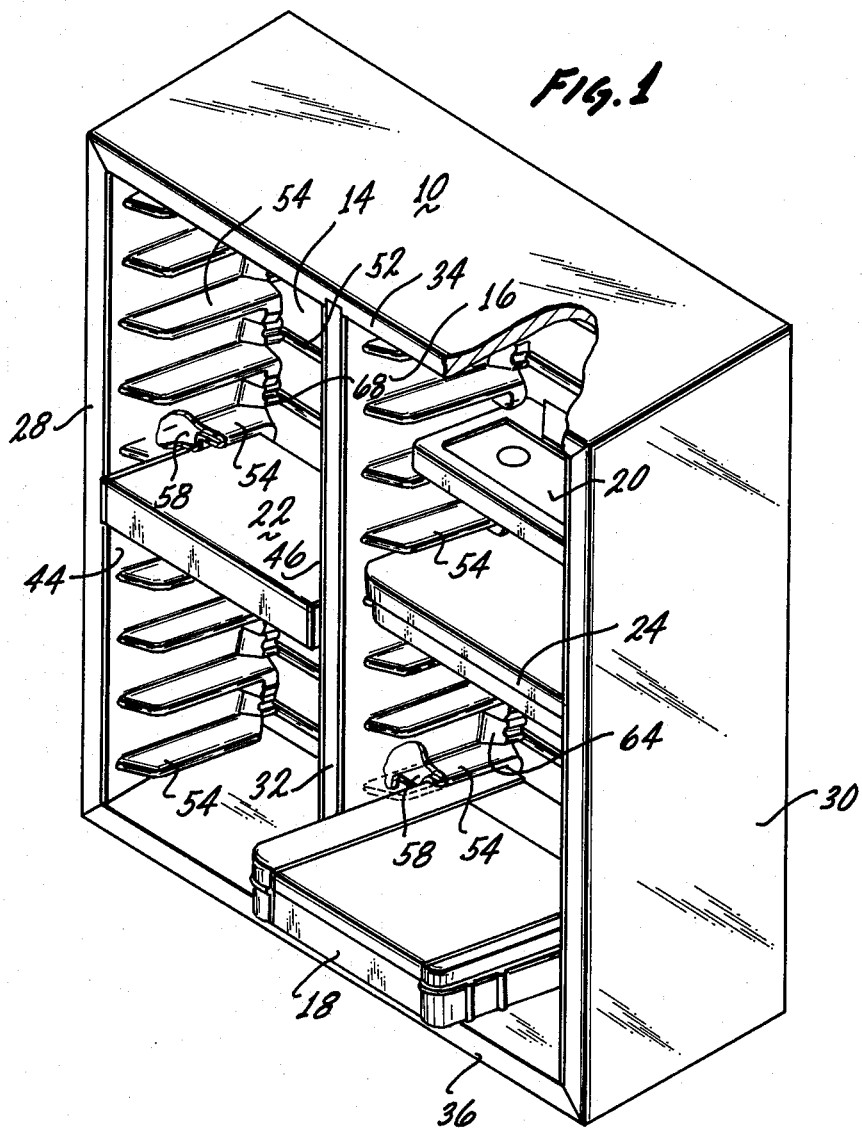

In FIG. 1 a perspective view of a first embodiment of a magnetic tape cartridge and cassette holder 10 is shown. As can be seen in FIG. 1, the cassette holder includes a pair of parallel columns 14 and 16 and with each column including separate openings formed by shelves for individually supporting magnetic tape cartridges and cassettes. As shown in FIG. 1, each column has ten shelves, but it is to be appreciated that any number may be used. The left-hand column 14 of shelves is shown to be empty, but the right-hand column 16 of shelves is shown to be supporting different types of individual magnetic tape cartridges, cassettes and boxes for cassettes. For example, magnetic tape cartridge 18 is generally of the type that has eight tracks and includes an endless loop. The cartridge 18 is not in any type of box. A magnetic tape cassette 20 is generally of the type that has four tracks and is reel-to-reel. The cassette 20 is not shown in any type of box. Boxes 22 and 24 are actually the outside containers for receiving four track reel-to-reel cassettes such as the type shown by cassette 20. However, the different types of boxes 22 and 24 have slightly different dimensions and the individual shelves and dimensions of the columns 14 and 16 are designed to receive and to securely support all of the different types of cartridges, cassettes and the boxes for the cassettes.

Figure 2:
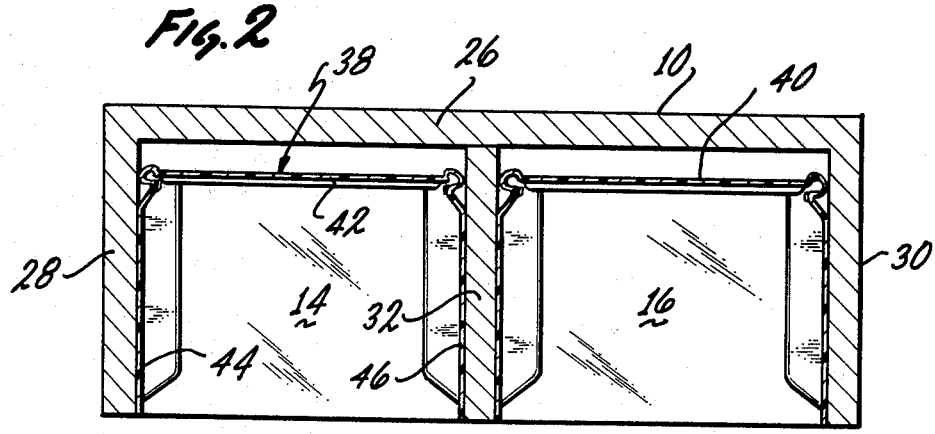
FIG. 2 illustrates a top cross-sectional view of the first embodiment of the invention.

FIG. 2 illustrates a top cross-sectional view of the first embodiment of the magnetic tape holder 10. As can be seen in FIG. 2, the holder is formed as an outer structural member including a back wall 26, sidewalls 28 and 30, and a center divider wall 32. There are also top and bottom walls 34 and 36 as shown in FIG. 1. The actual columns 14 and 16 of shelves are formed by unitary molded members 38 and 40 which are molded to include integral shelf supports for receiving the various magnetic tape cartridges and cassettes. The molded members 38 and 40 may be substantially identical and a single molded member 38 is shown in perspective view in FIG. 3 and is illustrative of all of the molded members. In particular, as shown in FIG. 3, the molded member 38 includes a back wall 42 and sidewalls 44 and 46 which are integrally formed with the back wall 42 and may be folded to the desired configuration about integrally formed hinges 48 and 50.

The back wall 42 of the molded member 38 includes a plurality of projections 52 which form stop means for the four track reel-to-reel cassettes 20 when not in a box. This may be seen more clearly with reference to FIG. 4 where cassette 20 is shown in the fully inserted position and with a projection 52 providing for a stop so that the cassette 20 can only be inserted a particular distance. The projections 52 also provide for a stiffening of the back wall 42.

The sidewalls 44 and 46 each include a plurality of shelf supports 54 and 56 which operate as pairs of oppositely disposed shelf supports to receive and support all of the different types structures 18 through 24 as shown in FIGS. 1 and 4. The wall members 44 and 46 also include additional molded components to provide for dimensional guides for the different types of structures. For example, immediately below each shelf support 56 on sidewall 46 is a stepped portion 58 as shown in FIGS. 3 and 4 and with identical stepped portions 60 included with sidewall 44. Actually, the lowest shelf in both sidewalls 44 and 46 does not include a stepped portion below the shelf since it is not necessary. In addition, the top shelf in both sidewalls 44 and 46 is slightly truncated so as to clear the top wall 24.

At the inner end of each shelf portion 54 and 56 in the sidewalls 44 and 46, stop members 62 and 64 are included to provide for a stop for the magnetic cartridge 18 and the boxes 22 and 24. The stop members 62 and 64 are relieved at positions 66 and 68 so as to provide for locking portions for the cassette 20 as shown in FIG. 4. Specifically, the height of the locking portions 66 and 68 is approximately the same height as the height of the cassette 20. Also, the distance between each pair of recess portions 66 and 68 is approximately the same distance as the width of the four track reel to reel cassette 20. This will lock the cassette 20 in the position shown in FIG. 4 when the cassette 20 is inserted into the recess portions 66 and 68.

The stop portions 62 and 64 provide a stop projection for the eight track cartridge 18 and also boxes 22 and 24 which are designed to receive cassettes such as cassettes 20. The stop portions insures that the different types of structures are properly positioned against the back of each shelf support section. In addition, the width between the sidewalls 44 and 46 has a dimension approximately the same as the width of the largest structure to be received which is the box 22. The width of the box 24 is slightly smaller but the sidewalls still act as guides and retainers. Also the height between the bottom of each stepped portion 58 and the top of the adjacent shelf 54 has a dimension approximately the same as the height of the box 22. The container 22 therefore is securely received between the sidewalls 44 and 46 and also is prevented from upward movement by the stepped portions 58 and 60. The height of the box 24 is slightly smaller than the height of the box 22 but the dimensions of each shelf section are such that the box 24 is also retained between the sidewalls 44 and 46 and prevented from upward movement by the stepped sections 58 and 60.

The stepped portions 58 and 60 also protrude a specific distance from their respective sidewalls and within the opening and the distance between each pair of stepped portions 58 and 60 is approximately the same as the width of the cartridge 18. The eight track cartridge 18 is therefore held and guided between the stepped sections 58 and 60 and prevented from sidewise motion by these stepped sections. The distance between adjacent shelf portions 56 and 54 is approximately the same as the height of the eight track cartridge 18 so the shelf portions 54 and 56 prevent the eight track cassette 18 from upper movement.

It can therefore be seen that the present invention provides for a plurality of shelf supports having structure to support different types of cartridges, cassettes and cassettes in boxes and with all these different types of structures retained securely in position yet with each structure in its own particular position and with easy access for removal of any of the individual structures. The present invention provides for unitary molded members which are hinged to produce sidewalls, a back wall and an open front and with the unitary molded member received and supported within a retaining outside structure. However, it is to be appreciated that the molded member may be composed of individual components rather than a unitary member and also the individual components may be formed without an outside structure.

FIG. 5 illustrates a second embodiment of the invention including four columns 100 through 106 of shelf supports forming separate openings for receiving and supporting magnetic tape cartridges and cassettes. The individual columns are located on opposite sides of the holder and each individual column may be formed of a unitary structure such as the unitary molded member 38 shown in FIG. 3. In the embodiment shown in FIG. 5, sidewalls 108 and 110 and divider wall 112 are longer than those shown in the first embodiment so as to provide for the additional storage on both sides of the holder. The remaining portions of the structure shown in the second embodiment of FIG. 5 are substantially similar to that shown in the first embodiment of the invention shown in FIGS. 1 through 4.

Although the present invention has been described with reference to particular embodiments, it is to be appreciated that various adaptations and modifications may be made and the invention is only to be limited by the appended claims.

I claim:

1. A holder for receiving and supporting magnetic tape cartridges, cassettes or containers for the cassettes each having a particular height and width dimension and with the holder including a pair of spaced sidewalls and with the distance between the spaced sidewalls approximately equal to the width of the containers for the cassettes, a plurality of pairs of spaced shelf supports extending from the sidewalls and forming a column of separate openings for receiving and supporting the cartridges, cassettes and containers for the cassettes and with the distance between the adjacent shelf supports on the same sidewall approximately equal to the height of the cartridges, a plurality of pairs of spaced stepped portions each extending from a sidewall and one shelf support and within an opening and with the distance between each stepped portion and the other adjacent shelf support on the same sidewall approximately equal to the height of the containers for the cassettes and with the distance between each pair of spaced stepped portions on opposite sidewalls approximately equal to the width of the cartridge, and a plurality of pairs of spaced projecting locking portions each extending from a sidewall and within one opening and with the height of each locking portion approximately equal to the height of the cassette and the distance between each pair of spaced locking portions on opposite sidewalls approximately equal to the width of the cassette.

2. The holder of claim 1 wherein the shelf supports, the stepped portions and the locking portion are all arranged angularly so that the cartridges, cassettes and containers for the cassettes are tilted upwardly.

3. The holder of claim 1 additionally including a back wall and with the sidewalls and back wall formed as a single molded member and with the sidewalls connected to the back wall by integral hinges.

4. The holder of claim 1 additionally a back wall and with a plurality of spaced projections extending into the openings adjacent the locking portions and forming stop members for the cassettes.

5. The holder of claim 1 additionally including a plurality of pairs of spaced stop projections each extending from a sidewall and within an opening at an interior position and with the stop projections forming stop members for the cartridges and containers for the cassettes.

6. The holder of claim 5 wherein the stop projections form part of the locking portions.

7. The holder of claim 1 wherein the sidewalls are supported within an outside enclosure.

8. The holder of claim 7 wherein the outside enclosure supports at least two side by side columns of separate openings formed by at least two pair of spaced sidewalls.

9. The holder of claim 7 wherein the outside enclosure supports at least two back to back columns of separate openings formed by at least two pair of spaced sidewalls.

* * * * *